Feb. 16, 1965     T. O. SNIDER     3,169,261
RAMP MECHANISM

Filed June 6, 1960     3 Sheets-Sheet 1

INVENTOR.
THEODORE O. SNIDER
BY
*Dybvig and Dybvig*
HIS ATTORNEYS

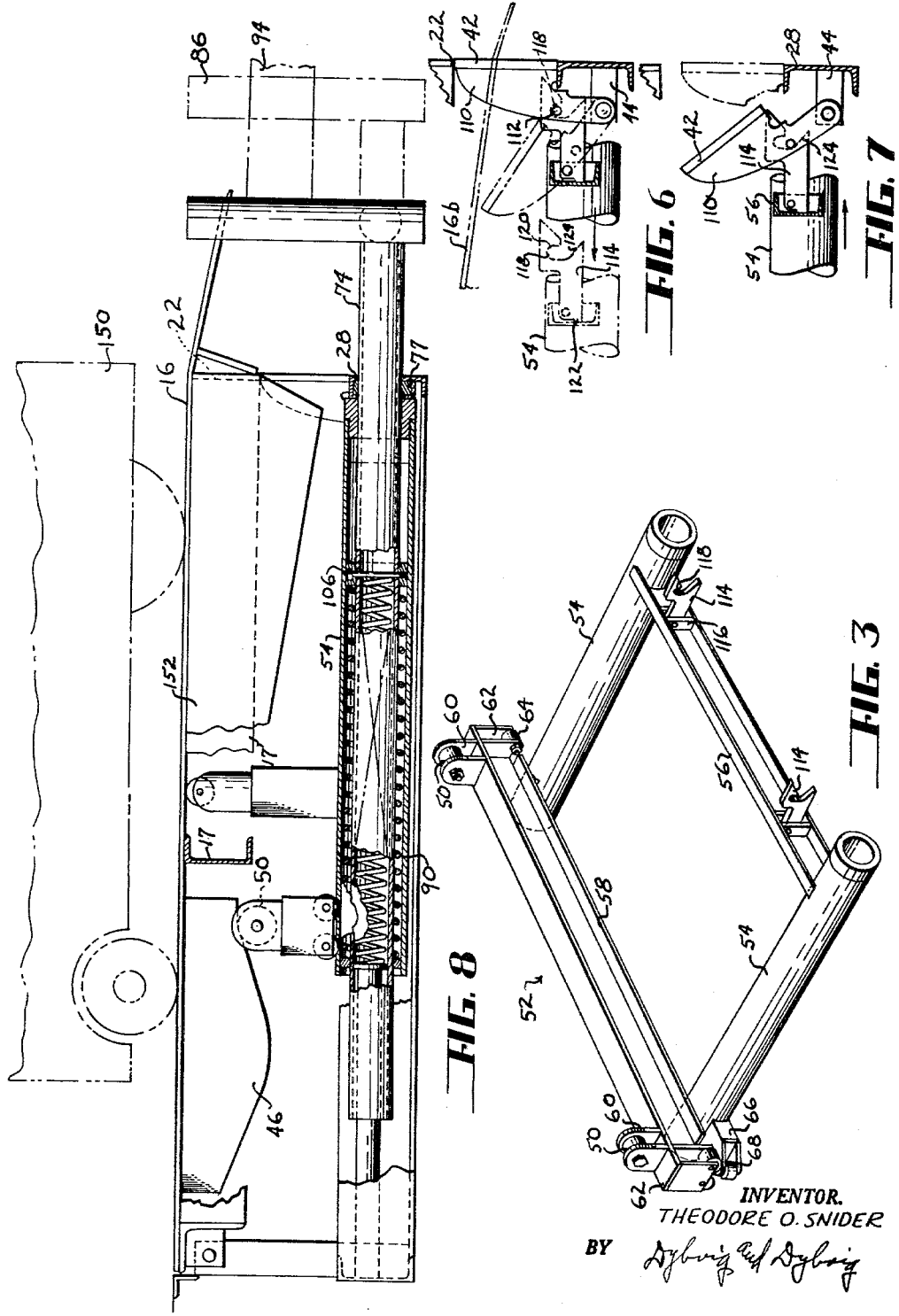

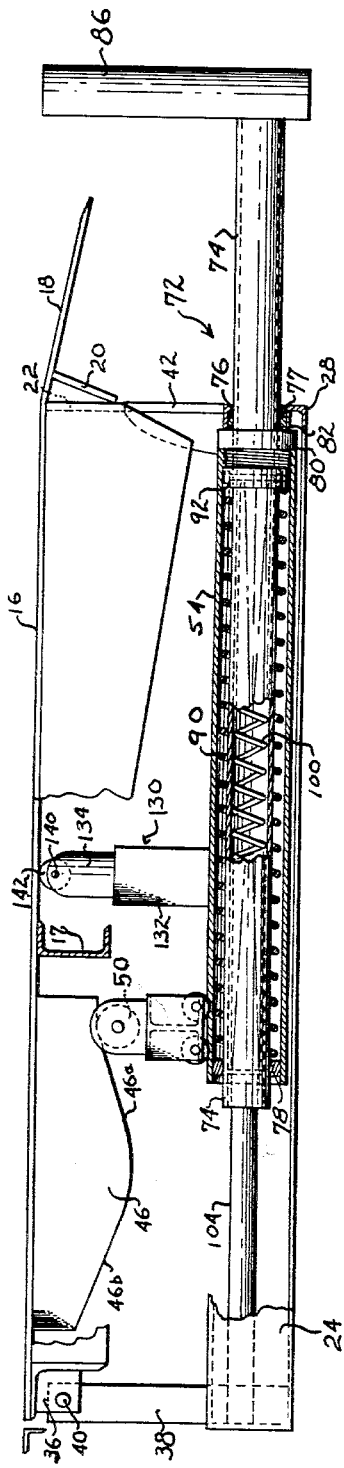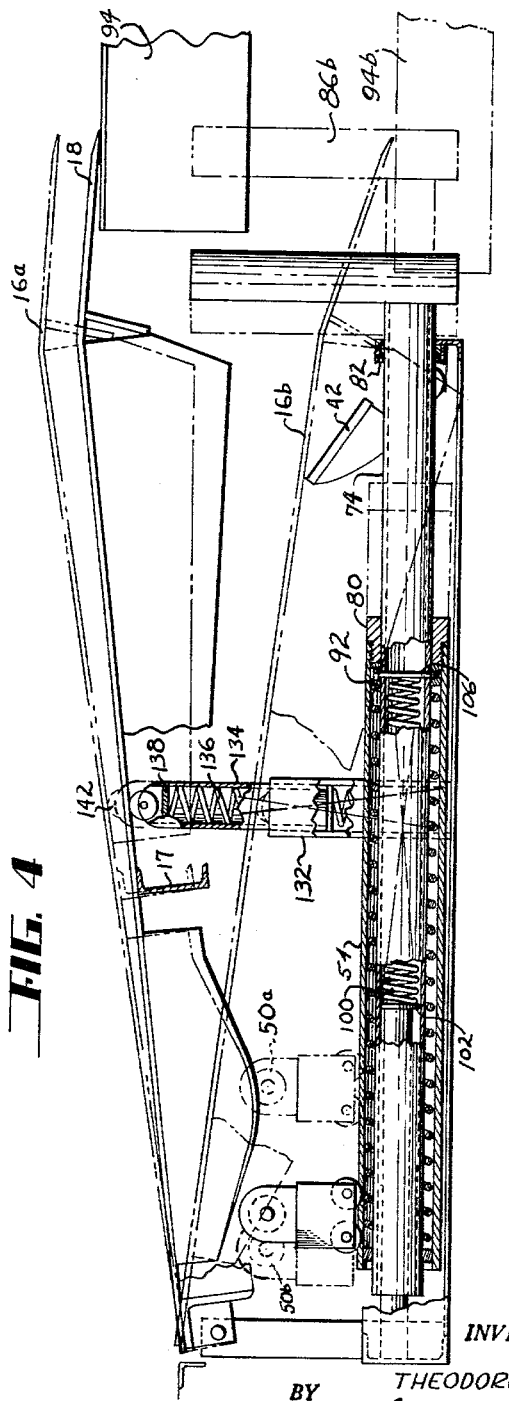

3,169,261
RAMP MECHANISM
Theodore O. Snider, Dayton, Ohio, assignor to The Joyce-Cridland Company, Dayton, Ohio, a corporation of Ohio
Filed June 6, 1960, Ser. No. 34,201
11 Claims. (Cl. 14—71)

This invention relates to a ramp mechanism, and more particularly to a vehicle actuated mechanism for raising and lowering a ramp plate so that the forward end of the plate may rest upon the bed of the vehicle.

An object of this invention is to provide a reliable and safe ramp mechanism actuated by a vehicle which engages a portion of the ramp mechanism upon approaching the platform on which the ramp is situated.

A further object of this invention is to provide a ramp mechanism for raising and lowering a ramp plate, which mechanism is almost entirely enclosed beneath the ramp plate.

Other objects and advantages reside in the construction of parts, the combination thereof, the method of manufacture and the mode of operation, as will become more apparent from the following description.

Referring to the drawings:

FIGURE 3 is a perspective view of a carriage used in the ramp mechanism.

FIGURE 4 is a side elevational view of the ramp mechanism, with portions broken away, showing the ramp plate in its normal or rest position.

FIGURE 5 is an end view similar to FIGURE 4 showing the ramp plate in an elevated position.

FIGURES 6 and 7 are partial end views showing a portion of the ramp plate support.

FIGURE 8 is an end elevational view illustrating another condition of operation of the ramp mechanism.

Figure 1:
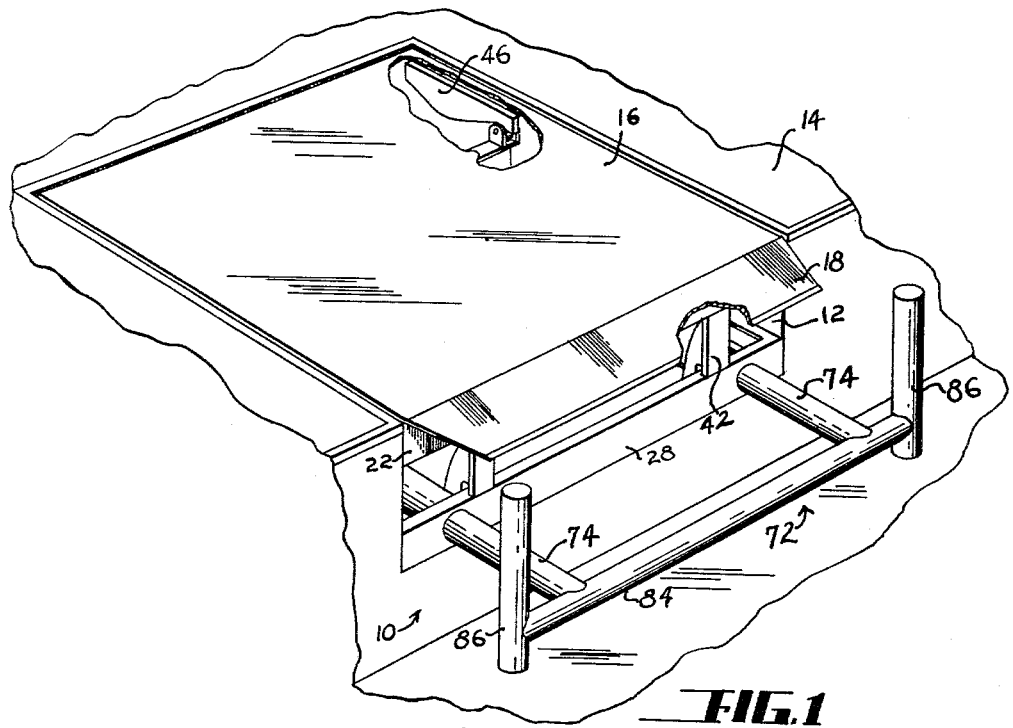
FIGURE 1 is a perspective view of a ramp mechanism made in accordance with this invention mounted on a loading platform or dock.

Referring to FIGURE 1, a ramp mechanism 10 made in accordance with this invention is mounted within a recess 12 provided in a loading dock or platform 14. The ramp mechanism includes the usual ramp plate 16 which normally lies in a horizontal position with its top surface in the plane of the top surface of the loading platform 14. While the plate 16 may be simply a flat piece of metal, it is desirable to provide a plurality of stiffening ribs as indicated at 17. An apron 18 is provided forwardly of the plate 16 for engaging the bed of the truck or other vehicle which is to be loaded or unloaded. The apron 18 is normally welded to the plate 16 and may be supported by a brace 20 (FIGURE 4), the lower portion of which engages the side of a downwardly extending transverse flange 22 welded to the front of the plate 16.

Figure 2:
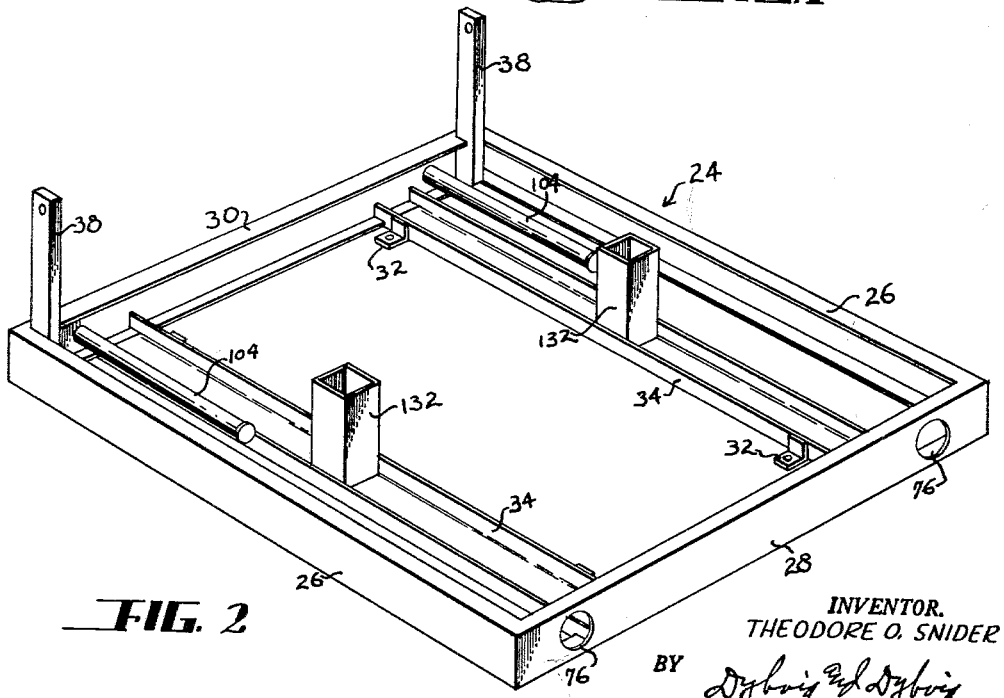
FIGURE 2 is a perspective view of the base of the ramp mechanism.

The plate 16 is supported on a base 24, shown most clearly in FIGURE 2, comprising a pair of channeled sidewalls 26, a forward channeled wall 28 and a rear channeled wall 30. The base 24 is secured to the bottom of the recess 12 by any suitable means, such as, for example, bolts (not shown) which extend through apertures provided in brackets 32 mounted on a pair of transversely extending channels 34. With this construction, the entire ramp mechanism may be installed within the recess 12 as a single unit in a few minutes. The back end of the plate 16 is provided with hinge plates 36 which straddle rear support posts 38 which, in turn, are rigidly attached to the rear wall 30 of the base 24. The hinge plates 36 pivot about hinge pins 40 extending through cooperating apertures provided in the hinge plates and the top of the rear support posts 38. The front end of the plate 16 is supported on a pair of support pads 42 which, as shown in FIGURES 6 and 7, are pivotally attached to hinge plates 44 mounted in the internal face of the forward wall 28. The reason the support pads 42 are pivotally mounted will be discussed below.

While the ramp plate 16 is useful in the position shown in FIGURES 1 and 4, it often desirable to be able to raise or lower the plate so that the apron 18 may engage the top of the bed of the truck or other vehicle being loaded or unloaded. Conventionally, the loading platform is approximately 48 inches high while the beds of trucks are often as high as 60 inches or as low as 36 inches. In order to so raise or lower the ramp plate, a pair of parallel, convex, downwardly extending cams 46, having descending faces 46a and ascending faces 46b are fixedly attached to the bottom face of the plate adjacent the back end thereof. The cams 46 are engaged by cam followers or actuating rollers 50 mounted for movement in a horizontal plane longitudinally along the length of the cam faces 46a and 46b. The normal position for the rollers 50 when the ramp plate is in a horizontal position is shown in FIGURE 4. As shown therein, the forward portion of the cam surfaces 46a are substantially horizontal so that the rollers aid in supporting the ramp plate 16 in its horizontal position. Upon initial movement of the rollers 50 to the left as shown in FIGURE 4, that is rearwardly of the ramp plate, the plate will be cammed so as to pivot in a counterclockwise direction about hinge pins 40, thereby elevating the front end of the ram plate and the apron 18.

To effectuate rearward movement of the rollers 50, they are mounted on a carriage 52, shown most clearly in FIGURE 3. The carriage 52 is comprised of a pair of parallel, cylindrical, hollow or tubular arms 54 interconnected by a channel 56 extending between the forward portions thereof. The arms 54 are connected at their rearward ends by a carriage beam 58, upon which is mounted a pair of yokes 60 which support the rollers 50. A pair of yokes 62, which support rollers 64, are mounted at each end of the carriage beam. Similarly, a pair of yokes 66 which support rollers 68 are mounted on the outer portions of the arms 54. The rollers 64 engage the top of the side channels 26 while the rollers 68 engage the internal faces of the side channels 26 to slidably support the rear of the carriage 52 on the base 24. In addition, the carriage 52 is slidably mounted upon an actuating assembly 72, which includes a pair of parallel, cylindrical, hollow or tubular actuating arms 74 extending longitudinally of the ram plate through the tubular arms 54 and through cooperating apertures 76 provided in the forward wall 28 of the base 24. The actuating arms 74 are supported by annular guide bearings 77 which abut the internal face of the forward channel 28 around the periphery of the apertures 76. The arms 74 are similarly supported about the carriage arms 54 by rear annular guide bearings 78 and by bearing nuts 80 which are threadedly engaged with the carriage arms 54. Normally the faces of the nuts 80 engage end plates 82 welded to the forward channel 28 in overlying relationship to the guide bearings 77. The actuating assembly 72 is provided with a bumper including a horizontally extending bumper arm 84 rigidly attached to each of the longitudinal actuating arms 74 and a pair of bumper posts 86 mounted at each end of the bumper arm 84.

While the actuating arms 74 are slidably received within the carriage arms 54, the two pairs of arms normally act as one link. This is accomplished by interconnecting said arms by springs 90 enclosed within the arms 54 and encircling the arms 74. The rearward portion of each spring 90, shown to the left in FIGURE 4, engages a guide bearing 78 while the forward portion of each spring 90 engages an annular stop collar 92 which also encircles each arm 54. The springs 90 are sufficiently strong under normal operating conditions that, when a truck or a similar vehicle approaches the ramp and engages the bumper assembly 84, 86, the actuating arms 74 and the carriage arms 54 are moved rearwardly as one unit.

The operation of the mechanism as thus far described is shown in FIGURE 5. The normal or rest position of the bumper assembly 84, 86 is indicated by dotted lines 86b to the right of FIGURE 5. At this point, a truck bumper (not shown) first engages the bumper assembly 84, 86. Upon movement of the truck towards the platform, the actuating assembly 72 and carriage 52 are moved to a position wherein the roller 50 occupies a position 50a at the depending crest of the cam. In this position, the front of the ramp plate is at its highest elevation, as indicated at 16a. Continued rearward movement of the vehicle causes the roller to move past the crest of the cam 46 to the full line position shown in FIGURE 5 wherein the ramp plate is permitted to lower to the top surface of the truck bed, indicated schematically by the full lines 94.

A bumper spring 100 is enclosed within each actuating arm 74. The rear portion of each spring 100, shown in the left in FIGURE 5, engages a spring retainer plate 102 which is fixedly mounted on the end of a retainer arm 104. As shown most clearly in FIGURE 2, the spring retainer arms 104 are mounted on the internal face of the rear wall 30. The bumper springs 100 bias the actuating arms 74 and the carriage arms 54 forwardly, i.e., to the right as shown in FIGURE 5, by engaging retaining screws 106 which extend through the stop collars 92 and the actuating arms 74. Initially, after the truck engages the bumper assembly 84, 86 and moves toward the ramp, thereby causing the bumper assembly and carriage to move rearwardly, the bumper springs 100 are placed under compression. When the truck withdraws from the ramp area, the springs 100 force the carriage and actuating assembly forwardly, that is to the right as shown in FIGURE 5, so that the mechanism again occupies its normal or rest position.

As stated earlier, the truck bed may lie below the horizontal height of the ramp plate 16 and accordingly, it is often necessary to permit the front end of the ramp plate to fall beneath its rest position shown in FIGURES 1 and 4. To enable the front end of the ramp plate to lower, the support pads 42 must pivot out of their supporting position. As shown most clearly in FIGURES 6 and 7, each pad 42 is mounted on an arm 110 which is pivoted at its bottom portion to the hinge plate 44. The sides of each of the arms 110 are provided with a laterally extending stud 112 which is engaged by one of a pair of latch pawls 114. As shown in FIGURE 3, each of the latch pawls 114 is pivotally mounted on hinge plates 116 to the channel 56. In the normal or rest position of the ramp mechanism, each support pad 42 is engaged between the top of the channel 28 and the bottom of the flange 22 provided on the ramp plate 16. This position is shown in full lines in FIGURE 6. In this position, each of the studs 112 is situated in a cutout portion 118 of its cooperating latch pawl 114. With the studs 112 located within the cutout portions 118, the supporting pads are locked in position since the carriage 52 is biased forwardly by means of the bumper springs 100. However, when the carriage 52 is forced rearwardly, thereby raising the ramp plate 16 through the cam means 46, 50 interengaging the carriage and plate, a forward edge 120 of the cutout portion 118 of each pawl 114 engages its adjacent stud 112 to pivot the supporting pad from the position shown in full lines in FIGURE 6 to that shown in phantom lines in FIGURE 6. Thus the support pads 42 are pivoted out of their supporting position upon rearward movement of the carriage, permitting the plate 16 to lower until it strikes the forward wall 28. Accordingly, in the event the bed of the truck is lower than the normal position of the ramp plate 16, as indicated by phantom lines 94b in FIGURE 5, the ramp plate may fall to the position indicated by phantom lines 16b. Of course, in order for the ramp plate 16 to lower to the position 16b, the rollers 50 must occupy the position shown by phantom lines 50b. Note that the rear of the cam faces 46b are nearer the bottom of the plate 16 than the forward portion of the cam faces 46a so that the rollers 50 do not support the ramp plate in the horizontal position as they do in the position shown in FIGURE 4.

When the bumper springs 100 force the carriage 52 back to its rest position, the latching pawls 114 are used to pivot the supporting pads 42 back into their supporting position. Each latching pawl 114 is provided with a stop surface 122 engaged with the face of the channel 56 so that the latching pawls may pivot only in a counterclockwise direction as viewed in FIGURES 6 and 7. Accordingly, the latching pawls 114 are held in the position illustrated by the phantom lines in FIGURE 6. When the latch pawls move forwardly along with the carriage 52, a cam surface 124 on the pawls engages the studs 112 to replace the studs to the cutout portions 118 as shown in FIGURE 7, thus replacing the support pads 42 in their supporting position.

It is thus seen that, by providing latch pawls on the carriage 52, the support pads 42 are locked in their supporting position when the carriage 52 is in its normal or rest position. Also, the latch pawls pivot the support pads out of their supporting position upon rearward movement of the carriage, thereby enabling the ramp plate 16 to fall below its horizontal orientation.

From the above it is seen that the ramp mechanism made in accordance with this invention is so constructed that a truck approaching the ramp will force the actuating assembly rearwardly, whereby the cam means 46, 50 cams the ram plate 16 initially upwardly and then permits the ram plate to lower until the apron 18 engages the top of the bed of the truck, whether the bed is higher or lower than the horizontal position of the plate. While the mechanism described up to this point operates in a satisfactory manner, it is apparent that there is a considerable load on the rollers 50 and that the load increases as the rollers move from the forward portions of the cam faces 46a to the rearward portions of the cam faces 46b. To reduce the load on the rollers 50, a pair of supplementary ramp supporting members 130 are provided centrally of the mechanism. Referring to FIGURES 2, 4 and 5, each of the supplementary support mechanisms 130 is shown as comprising a telescoping spring housing having a lower section 132 welded to the transverse channels 34 and an upper section 134 of reduced diameter slidably seated within the lower section 132. A spring 136 is mounted within the upper and lower sections and extends from the base of the lower section to a head 138 provided at the top of the upper section 134. A pair of flanges 140 extend upwardly from the top of the upper section 134 to serve as a yoke for a load bearing roller 142 which engages the bottom surface of the ramp plate 16. While the springs 136 are not sufficiently strong to support the ramp plate 16 by themselves, they do exert a constant force upwardly so that the load on the rollers 50 is considerably reduced. The supplementary supporting members 130 also serve to retard the ramp plate 16 at it lowers from its highest position 16a to the bed of a truck positioned against the ramp, thus reducing the force with which the ramp plate strikes the truck bed. Also, since the lowering movement of the plate 16 is retarded by the supplementary supporting devices 130, proper placement of the support pads 42 in their supporting position is assured at all times. That is, as a truck withdraws from the ramp area, the carriage 52 is first urged forwardly by the bumper spring 100 so that the ramp plate 16 is raised to its highest elevation indicated at 16a. Continued forward movement of the carriage 52 causes the latch pawls 114 to replace the support pads 42 into their supporting position. Even though the carriage 52 is in its extreme forward position, i.e., the extreme right position as shown in FIGURE 4, the ramp plate is not immediately returned to its normal horizontal position since the supplementary supporting members 130 retard its clockwise or lowering movement. Accordingly, it is assured that the support pads 42 will be in their supporting position to engage the bottom of the flanges 22 as the plate lowers upon withdrawal of the truck.

The springs 90 which interconnect the actuating arms 74 and the carriage arms 54 are much stronger than the bumper springs 100 so that, as stated before, the two pairs of arms normally move as a single unit. Under normal operating conditions, then, the front end of the ramp plate will raise whenever the bumper assembly 84, 86 is engaged by a truck or the like. However, if there is any load on the ramp plate, it may be undesirable to have the ramp plate elevated out of its horizontal position. Such a situation is illustrated in FIGURE 8 in which a warehouse truck, indicated schematically at 150, is placed on the ramp plate 16. Here the weight of the truck 150 is sufficient to overcome the springs 90. That is, even though the bumper assembly 84, 86 has been moved by a truck from its original position indicated by phantom lines to that indicated in full lines in FIGURE 8, the carriage 52 is not moved rearwardly since the weight of the truck 150 is transmitted through the cams 46 and rollers 50 to the carriage. Rather than lifting the ramp plate 16, the force of the truck backing against the bumper assembly 84, 86 merely places the springs 90 under compression.

Thus, a ramp mechanism is provided wherein the ramp plate will assume a position in which its apron engages the bed of a truck regardless of the height of the bed. No delicate or complex structure is required and the only portion of the ramp mechanism extending in front of the platform is the bumper assembly and a portion of the actuating arms 74, most of the mechanism being sheltered in the recess 12 beneath the ramp plate 16. These features render the mechanism highly reliable.

In addition to being reliable, the mechanism is also very safe in operation. Aside from the bumper assembly, there are no external moving parts. Importantly, all of the springs are completely enclosed so that even if a spring were to break, the possibility of its causing damage or injury is very slight. Also, since there is no direct connection between the plate and the lifting mechanism, even if the lifting mechanism failed to operate properly, the ramp plate would usually remain substantially undisturbed.

To enhance the safety in the operation of the ramp mechanism, the sides of the plates 16 are provided with downwardly extending skirts 152. Therefore, when the ramp plate is elevated, it is impossible to reach under the plate. This obviates the danger of anything becoming caught under the plate when it is elevated.

Another important function is obtained by the ramp mechanism. The height of the bed of the truck engaged with the bumper assembly may vary as it is loaded or unloaded. Since there is no direct connection between the ramp plate and the lifting mechanism, i.e. the carriage and the actuating assembly, the plate 16 will "float" up or down so that the apron 18 constantly remains in contact with the truck bed. This floating action of the plate 16 is essential to avoid damage to the truck bed in case it raises while being unloaded. In the event the truck bed lowers, the floating action is necessary to avoid a gap between the bed and the apron 18.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed in the appended claims.

Having thus described my invention, I claim:

1. In an apparatus for varying the height of the front end of a ramp plate, the combination comprising: pivot means mounting the back end of the ramp plate to a platform; support means normally occupying a supporting position for supporting the front end of said plate, said pivot means and said support means normally supporting said plate in a horizontal position with its upper surface lying in the plane of the upper surface of the platform; means pivotally mounting said support means; a cam mounted on the bottom surface of said plate, said cam having a convex, downwardly extending profile; a movable carriage mounted beneath said plate provided with a cam actuator engaged with said cam, said actuator being movable from the front to the rear of the cam profile for first raising said plate and then permitting said plate to lower; and a latch mechanism mounted on and movable with said carriage normally engaged with said support means locking said support means in the supporting position, said latch mechanism including means pivoting said support means out of the supporting position upon rearward movement of the carriage, whereby the front end of the plate may lower below its normal horizontal position.

2. The combination of claim 1 wherein said latch mechanism includes means engaging and replacing said support means in a supporting position upon forward movement of the carriage.

3. An apparatus for varying the height of the front end of a ramp plate comprising: pivot means mounting the back end of the ramp plate to a platform; support means normally occupying a supporting position for supporting the front end of the ramp plate, said pivot means and said support means normally supporting the plate in a horizontal position with its upper surface lying in the plane of the upper surface of the platform; means pivotally supporting said support means; a carriage slidably supported beneath the ramp plate, said carriage including a pair of longitudinally extending hollow members; cam means interengaging between the plate and the carriage to pivot the front end of said plate upwardly upon rearward movement of the carriage; latch means fixedly attached to said carriage, said latch means normally engaging and locking said support means in a ramp plate supporting position and including means pivoting said support means out of the ramp plate supporting position upon rearward movement of the carriage; an actuating assembly, said actuating assembly including a pair of longitudinally slidable arms extending within said hollow members and a bumper connected to said arms projecting forwardly of the ramp plate in a position to be engaged by a vehicle approaching the ramp plate; means interconnecting said arms and hollow members whereby a vehicle, upon approaching the ramp plate, engages said bumper to slide the actuating assembly and carriage rearwardly to raise the front end of said plate; and biasing means attached to said actuating assembly for returning said carriage and said actuating assembly forwardly upon withdrawal of the vehicle.

4. The apparatus of claim 3 in which said means interconnecting the arms and hollow members comprises a pair of springs, each of which encircles one of said arms, said springs normally causing said actuating assembly and said carriage to move as a single unit, but permitting said actuating assembly to move relative to said carriage when a heavy weight is placed on the plate.

5. The apparatus of claim 3 in which said arms are hollow and said biasing means comprises a pair of springs, each of which is enclosed within one of said arms.

6. The apparatus of claim 3 further including supplementary support means mounted beneath said plate and between said pivot means and said support means, said supplementary support means including a plate engaging member engaged with the underside of said ramp and a spring constantly biasing said plate engaging member into engagement with said plate.

7. The apparatus of claim 3 in which said latch means includes means to replace said support means in a supporting position upon return of said carriage forwardly as the vehicle withdraws.

8. In an apparatus for varying the height of the front end of a ramp plate, the combination comprising: pivot means mounting the back end of the ramp plate to a platform; support means normally occupying a supporting position for supporting the front end of said plate, said pivot means and said support means normally supporting said plate in a horizontal position with its upper surface lying in the plane of the upper surface of the platform; means pivotally mounting said support means; a movable carriage mounted beneath said plate; cam means interengaging between said plate and said carriage to pivot the front end of said plate upwardly upon initial rearward movement of said carriage and to permit the front end of said plate to lower upon continued rearward movement of said carriage; and a latch mechanism mounted on and movable with said carriage normally engaged with said support means locking said support means in the supporting position, said latch mechanism including means pivoting said support means out of the supporting position upon rearward movement of the carriage, whereby the front end of the plate may lower below its normal horizontal position.

9. In an apparatus for varying the height of the front end of a ramp plate, the combination comprising: pivot means mounting the back end of the ramp plate to a platform; a carriage slidably supported beneath the ramp plate; cam means interengaging between the plate and the carriage including a cam fixedly mounted on one of said carriage and said plate and a cam follower fixedly mounted on the other of said carriage and said plate; an actuating assembly connected to the carriage to move said carriage rearwardly, said actuating assembly including a bumper extending forwardly of the plate in a position to be engaged by a vehicle approaching the ramp plate, whereby a vehicle approaching the ramp plate engages said bumper to move said carriage rearwardly; and biasing means for returning said carriage and actuating assembly to their initial positions as the vehicle withdraws from the ramp plate, said cam having a continuous convex cam surface supported in fixed spaced relation to said one of said carriage and said plate, said cam follower having a surface engaging said cam surface supported in fixed spaced relation to said other of said carriage and said plate, said cam surface extending generally parallel to and longitudinally of the plane of the path of movement of said carriage whereby the front end of said plate is pivoted upwardly upon both rearward and forward movement of said carriage.

10. The apparatus of claim 9 in which said cam is mounted on the bottom surface of said plate.

11. In an apparatus for varying the height of the front end of a ramp plate, the combination comprising: pivot means mounting the back end of the ramp plate to a platform; support means normally occupying a supporting position for supporting the front end of said plate, said pivot means and said support means normally supporting said plate in a horizontal position with its upper surface lying in the plane of the upper surface of the platform; means pivotally mounting said support means; a movable carriage mounted beneath said plate; means engaged with said carriage for moving said carriage rearwardly beneath said plate; means interengaging between said plate and said carriage pivoting the front end of said plate upwardly upon initial rearward movement of said carriage, the front end of said plate lowering upon continued rearward movement of said carriage; and a latch mechanism mounted on and movable with said carriage normally engaged with said support means locking said support means in the supporting position, said latch mechanism including means pivoting said support means out of the supporting position upon rearward movement of the carriage, whereby the front end of the plate may lower below its normal horizontal position.

References Cited in the file of this patent

UNITED STATES PATENTS

| 2,689,965 | Fenton | Sept. 28, 1954 |
| 2,817,102 | Harris | Dec. 24, 1957 |
| 2,994,894 | Loomis et al. | Aug. 8, 1961 |
| 3,021,545 | Le Clear et al. | Feb. 20, 1962 |
| 3,075,213 | Loomis | Jan. 29, 1963 |

FOREIGN PATENTS

| 26,868 | Finland | Feb. 2, 1954 |